US012319892B2

(12) United States Patent
Pirijanian

(10) Patent No.: US 12,319,892 B2
(45) Date of Patent: Jun. 3, 2025

(54) WICK CENTERING DEVICE

(71) Applicant: Armik Pirijanian, Glendale, CA (US)

(72) Inventor: Armik Pirijanian, Glendale, CA (US)

( * ) Notice: Subject to any disclaimer, the term of this patent is extended or adjusted under 35 U.S.C. 154(b) by 0 days.

(21) Appl. No.: 18/540,671

(22) Filed: Dec. 14, 2023

(65) Prior Publication Data

US 2024/0199978 A1 Jun. 20, 2024

Related U.S. Application Data

(60) Provisional application No. 63/432,430, filed on Dec. 14, 2022.

(51) Int. Cl.
*C11C 5/02* (2006.01)
*C11C 5/00* (2006.01)

(52) U.S. Cl.
CPC .............. *C11C 5/023* (2013.01); *C11C 5/006* (2013.01)

(58) Field of Classification Search
CPC ................................ C11C 5/023; C11C 5/006
See application file for complete search history.

(56) References Cited

U.S. PATENT DOCUMENTS 6,444,156 B1 * 9/2002 Schwarz ................. C11C 5/025 264/405

FOREIGN PATENT DOCUMENTS

AU 2014202755 B2 * 5/2015

* cited by examiner

*Primary Examiner* — Cephia D Toomer
(74) *Attorney, Agent, or Firm* — Avakian IP

(57) ABSTRACT

The present disclosure provides an apparatus method and systems for assembling a candle having a container, wick and wax, wherein the wick is placed in the desired location within the container using a magnet.

14 Claims, 2 Drawing Sheets

WICK CENTERING DEVICE

This application claims the benefit of U.S. Provisional Patent Application No. 63/432,430, filed Dec. 14, 2022, which is incorporated in it's entirety herein.

TECHNICAL FIELD

The disclosure general relates to an apparatus for centering wick into a container, generally related to candles and candle manufacturing. More specifically the subject disclosure teaches a method and apparatus for centering a wick, which may be used in manufacturing, as a hobby, or other general purposes known in the art.

BACKGROUND ART

Candles have been known and used since early civilization. A typical candle is formed of a solid or semi-solid body of a candle fuel, typically a wax such as paraffin wax or beeswax, and it contains an axially embedded combustible fibrous wick. When the wick of such a candle is lit, the generated heat melts the solid wax, and the resulting liquid flows up the wick by capillary action and is combusted.

In the past, candles typically have been made of wax having a wick extending along the center axis of the formed candle. The wick may be made of cotton or other material. However, it is very difficult to center the wick in the container, especially when more than one wick is being utilized.

Existing methods include a needle-like element which is heated and inserted into the top of a candle to melt wax sufficiently for a wick to be inserted. The wax can then be solidified around the wick. In addition, multiple wicks can be placed within the candle and the heated needle-like element can be used to trim uneven wax. In other methods, candles can be initially molded without a wick to allow a person to add wicks after a candle has been made to thereby customize a candle as desired by the individual. This can also provide safer candles since many candle wicks contain zinc which can be harmful when burned and this process allows for the insertion of a safer wick in the candle.

In other assembly methods, the candles require a structure to hold the wick upright throughout the burning of the candle. The structure used in the prior art is called a "wick clip", generally using a metal disc attached to the bottom end of the wick. By way of example, the candle is molded in a first manufacturing machine with a central, vertical fissure. The wick clip is made and the wick is attached thereto in a second manufacturing machine, and the wick and wick clip are assembled through the hole of the candle. The wick clip rests on the bottom surface of the receptacle and supports the wick during burning of the candle.

The following U.S. patents illustrate electrically heated tools for different purposes including wax shaping tools. The Anton patent, U.S. Pat. No. 3,316,385, shows an electric heating and soldering gun while the Caliri U.S. Pat. No. 3,002,077 is for a soldering tool. The Ellis U.S. Pat. No. 2,119,908 discloses a wax modeling tool for dental work that is heated with gas while the Westerback et al. U.S. Pat. No. 3,120,598 discloses another wax shaping tool for dental molds. It does not show a tip. The Huffman U.S. Pat. No. 4,301,357 shows another wax shaping tool. The Christensen U.S. Pat. No. 3,821,513 illustrates a wax carving tool with various heating tips. The Patillo et al. U.S. Pat. No. 5,073,696 shows an electrically heated wax shaping tool with different tips while the Anderson et al. U.S. Pat. No. 3,938, 526 is for an electrically heated acupuncture needle. The German patent No. 856,929 shows a wax shaping tool.

However, the existing methods for manufacturing candles with wicks is time consuming, and requires multiple steps and manual labor, thus adding to the overall cost of the candle.

SUMMARY

The present disclosure provides a wick setting apparatus comprising: a base containing at least one magnet: a container for housing a candle wax; and a wick having a metallic base, wherein the magnet in the base in configured to suspend the metallic base of the wick in a desired location of the container prior to adding the candle wax. In further embodiments, the desired location for the magnet is the center of the container.

In yet another embodiment, the base contains multiple magnets. In yet another embodiment, the base further comprises two movable arms configured to each move horizontally towards the center of the base.

Furthermore, the two movable arms are configured to capture the container on the base. In addition, the two movable arms may be urged towards the center of the base using a spring.

Furthermore, the base comprises a measurement indicator to accommodate containers of varying sizes and shapes.

In addition, the magnet in the base may comprise a first magnet and a second magnet, wherein the first magnet is adjacent to the second magnet, wherein the two magnets work in unison to center the wick.

The subject innovation also teaches a method for setting a wick, the method comprising: an apparatus comprising: a base containing at least one magnet; a container for housing a candle wax; and a wick having a metallic base, setting the wick in the container using the magnet; and adding candle wax to the container; wherein the magnet in the base in configured to suspend the metallic base of the wick in a desired location of the container prior to adding the candle wax.

BRIEF DESCRIPTION OF DRAWINGS

The accompanying drawings, which are incorporated in and constitute a part of the specification, illustrate exemplary embodiments of the present invention.

DETAILED DESCRIPTION

The following description of exemplary embodiment(s) is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate. For example, member formation and manufacturing may not be discussed in detail, however such processes as known by one of ordinary skill in the art and equivalent methods, processes, and materials would fall within the intended scope of exemplary embodiments. For example, materials, temperatures of formation, sizes of layers, and time increments for steps may be discussed, however other materials, times, temperatures, and sizes are meant to lie within the scope of exemplary embodiments.

Figure 1:
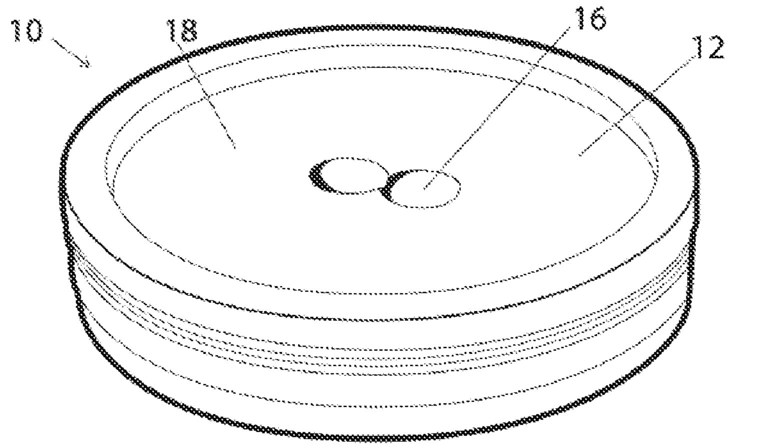
FIG. 1 provides a front perspective view of a candle wick centering apparatus according to one or more embodiment of the subject disclosure.

FIG. 1 provides a front perspective view of a candle wick centering apparatus 10 according to one or more embodiment of the subject disclosure. In this embodiment, the base 12 is adapted in size and shape to snuggly house a container 14 used for the candle (also referred to herein as "candle container" 14). The base 12 further comprises at least one magnet 16 found in the support 18 base 12 for centering a metallic wick 20. Although a single magnet 16 has been shown FIG. 1, multiple magnets may be be utilized, as will be detailed in further embodiments.

Although the base 12 is comprised of wood in FIG. 1, alternative appropriate materials may be used to construct the base, including heavy-stock paper, metal, fiberglass, cardboard, combinations thereof, and alternatives therein. In addition, the base 12 may have internal rings 22 (see FIG. 2) for accommodating different sized (width) containers 14. The internal rings may be removable for greater utilization of the base 12 with varying sized containers 14.

In manufacturing a candle, incorporating the candle wick centering apparatus 10 in FIG. 1, the container 14 is placed within the base 12, and a drop of glue is added to the inside of the container 14, where the wick 20 would be centered. The wick 20 is placed near the center of the container 14, where the magnet 16 engages and centers the wick 20 with the glue. The glue is allowed to harden and the centered wick 20 and container 14 are ready to receive the wax. Once the wax dries, the container 14 is removed from the base 12, where the wick was held in place by the magnet 16.

Figure 2:
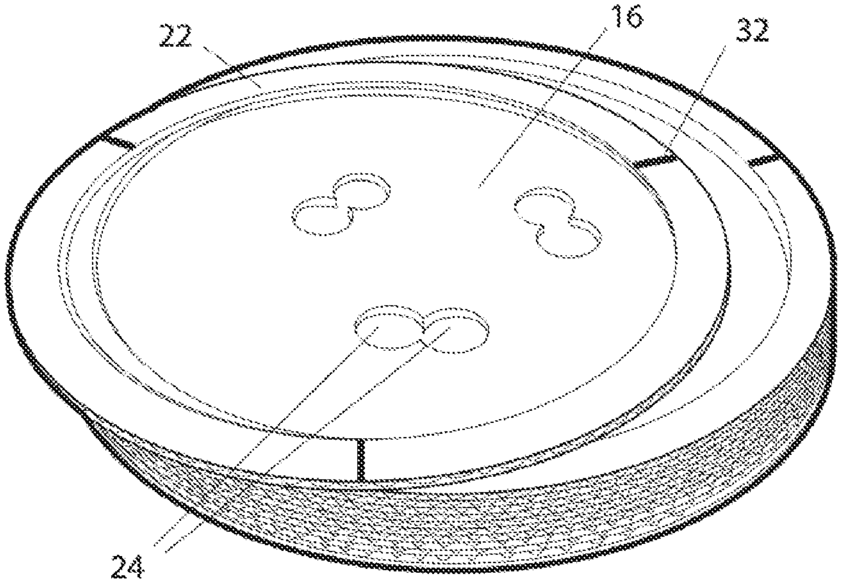
FIG. 2 provides a front perspective view of a candle wick centering apparatus according to one or more embodiment of the subject disclosure.

In another embodiment, seen in FIG. 2, the base 12 has three magnets 16, and utilizes an internal ring 22 to reduce the circumference of the base 12 to accommodate a smaller diameter container 14. In addition, FIG. 2 utilizes a dual magnet 24 at each of the three magnet locations. The dual magnet 24 is instrumental in that one magnet 16 creates a pull where the closest metal part presented to the magnet 16 is what is pulled and not necessarily centered since the magnet 16 will attract the closest metal part to the magnet 16. However, when you have two magnets 24, slightly separated, they both pull the metal or wick 20 to each of the magnets 24, and since the strength of the magnets 24 are the same, it centers the metal between the two magnets and therefore in the center of the container 14. Furthermore, the outer edge of the base 12 may contain a marker 32 for identifying the location of the magnet 24, when multiple magnets 24 are utilized in the base 12.

Figure 3:
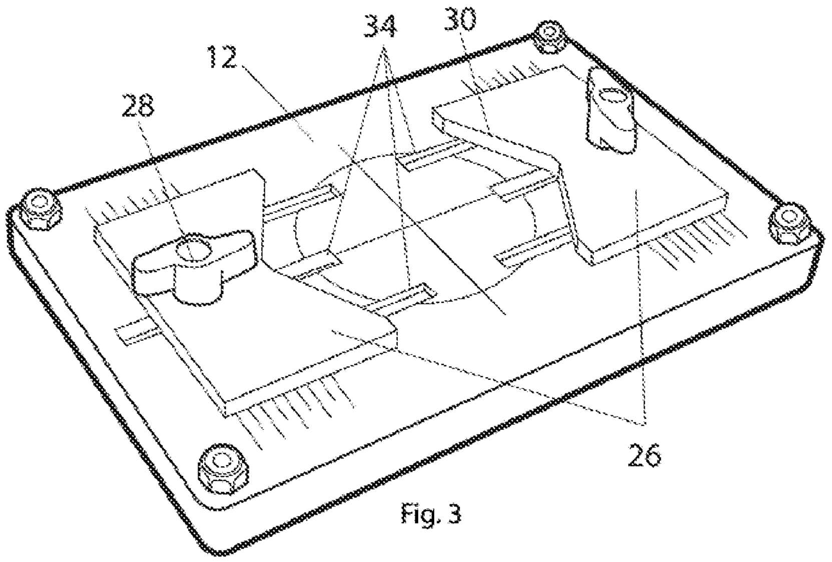
FIG. 3 provides a side perspective view of an adjustable candle wick centering apparatus, according to one or more embodiment of the subject disclosure.
Figure 4:
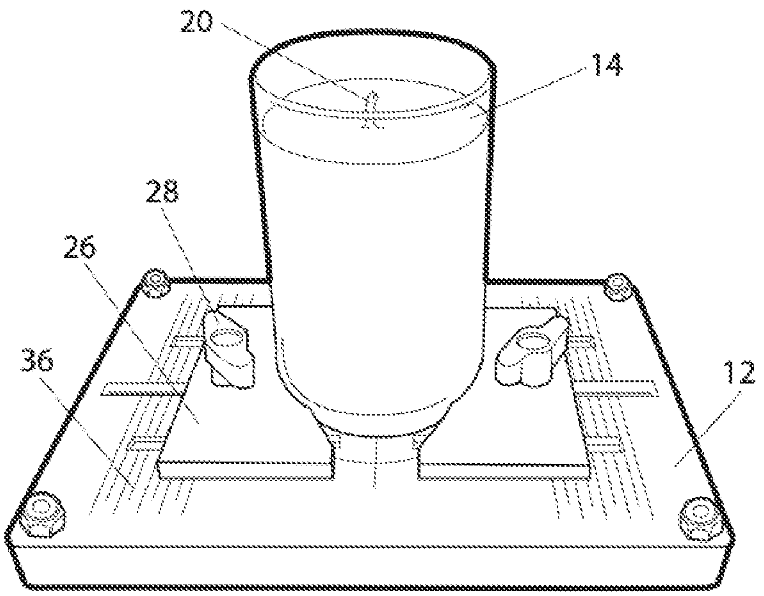
FIG. 4 provides a top perspective view of a candle wick centering apparatus and candle, according to one or more embodiment of the subject disclosure.

As implemented in FIGS. 3 and 4, the candle wick centering device 10 incorporates a base 12 having two movable arms 26 configured to accommodate various sized containers 14. Each of the movable arms 26 rides on horizontal slats 34 which allow each of the movable arms 26 to travel in the horizontal direction with respect to the length of the base 12. The movable arms 26 are locked into place using a compression fitting 28. As can be appreciated by a person of skill in the art, a variety of different locking means may be incorporated to suspend travel of the movable arm 26, including clips, toggles, t-fittings, to name a few. As depicting in FIG. 4, the container 14 is centered on the base 12, by at least one magnet 24, and the movable arms 26 are moved to trap the container and fulfill wick 20 placement and wax pouring.

Furthermore, a spring may be incorporated horizontally, between the base 12 and each of the movable arms 26, such that the spring urges the movable arms 26 towards the center of the base 12. Thus allowing for an end user to separate the two movable arms 26 by compressing the spring, inserting the container 14 in the center of the base 12, and releasing the movable arms 14 to capture the container.

The base 12 further comprises at least one magnet 24, situated centrally on the base, to center the wick 20 in the container 14. Once again, glue may be used to marry the wick 20 with the container 14.

As can been seen in FIGS. 3 and 4, the movable arms 26 may be concave 30 on the side of the movable arm 26 facing the inside of the base, thus allowing for better entrapment of the container 14. The movable arms 26 may be configured in other shapes to accommodate varying container 14 shapes. Further depicting in FIG. 4, the base 12, includes measurement values 36 for each the movable arms 26, thus ensuring proper and equidistance fit of the container 14 between the two movable arms 26.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

The invention claimed is:

1. A wick setting apparatus comprising:

a base containing at least one magnet:

a container for housing a candle wax; and a wick having a metallic base, wherein the magnet in the base in configured to suspend the metallic base of the wick in a desired location of the container prior to adding the candle wax, wherein the base further comprises two movable arms configured to each move horizontally towards the center of the base.

2. The apparatus of claim 1, wherein the desired location is the center of the container.

3. The apparatus of claim 1, wherein the base contains multiple magnets for two more wicks.

4. The apparatus of claim 1, where the two movable arms are configured to capture the container on the base.

5. The apparatus of claim 1, wherein the two movable arms are urged towards the center of the base using a spring.

6. The apparatus of claim 1, wherein the base comprises a measurement indicator to accommodate containers of varying sizes and shapes.

7. The apparatus of claim 1, wherein the magnet in the base comprises a first magnet and a second magnet, wherein the first magnet is adjacent to the second magnet.

8. A method for setting a wick, the method comprising:

an apparatus comprising:

a base containing at least one magnet:

a container for housing a candle wax; and a wick having a metallic base, setting the wick in the container using the magnet; and adding candle wax to the container;

wherein the magnet in the base in configured to suspend the metallic base of the wick in a desired location of the container prior to adding the candle wax, wherein the base further comprises two movable arms configured to each move horizontally towards the center of the base.

9. The method of claim 8, wherein the desired location is the center of the container.

10. The method of claim 8, wherein the base contains multiple magnets for two more wicks.

11. The method of claim 8, where the two movable arms are configured to capture the container on the base.

12. The method of claim 8, wherein the two movable arms are urged towards the center of the base using a spring.

13. The method of claim 8, wherein the base comprises a measurement indicator to accommodate containers of varying sizes and shapes.

14. The method of claim 8, wherein the magnet in the base comprises a first magnet and a second magnet, wherein the first magnet is adjacent to the second magnet.

* * * * *